(12) United States Patent
Connelly et al.

(10) Patent No.: US 7,438,952 B2
(45) Date of Patent: Oct. 21, 2008

(54) METHODS AND SYSTEMS FOR COATING ARTICLES HAVING A PLASTIC SUBSTRATE

(75) Inventors: Bruce A. Connelly, Gibsonia, PA (US); John R. Rassau, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 305 days.

(21) Appl. No.: 10/882,755

(22) Filed: Jun. 30, 2004

(65) Prior Publication Data

US 2006/0013958 A1    Jan. 19, 2006

(51) Int. Cl.
*B05D 5/00* (2006.01)
*B05D 7/02* (2006.01)
*B05D 1/02* (2006.01)
*B05D 1/36* (2006.01)

(52) U.S. Cl. .............................. 427/407.1; 427/427.4

(58) Field of Classification Search ............... 427/407.1
See application file for complete search history.

(56) References Cited

U.S. PATENT DOCUMENTS

| | | | |
|---|---|---|---|
| 4,755,553 A | 7/1988 | Kishimura et al. | 524/531 |
| 5,143,976 A | 9/1992 | Ashihara et al. | 525/227 |
| 5,188,882 A | 2/1993 | Uchiyama et al. | 428/159 |
| 5,430,093 A | 7/1995 | Miyamoto et al. | 524/504 |
| 5,436,079 A | 7/1995 | Brugel | 428/483 |
| 5,446,083 A | 8/1995 | Stevens et al. | 524/458 |
| 5,496,635 A | 3/1996 | Francis et al. | 428/352 |
| 5,527,571 A | 6/1996 | Brugel | 427/333 |
| 5,587,418 A | 12/1996 | Sasaki et al. | 524/504 |
| 5,753,739 A | 5/1998 | Diener et al. | 523/406 |
| 5,777,022 A | 7/1998 | Bugajski et al. | 524/527 |
| 6,210,758 B1 | 4/2001 | McNeil et al. | 427/409 |
| 6,225,402 B1 | 5/2001 | O'Callaghan et al. | 524/834 |
| 6,277,912 B1 | 8/2001 | Ashihara et al. | 525/65 |
| 6,306,956 B1 | 10/2001 | Spilman et al. | 524/601 |
| 2002/0028874 A1 | 3/2002 | Nothnagel et al. | 524/591 |
| 2002/0147269 A1 | 10/2002 | Spilman et al. | 524/600 |
| 2003/0055163 A1 | 3/2003 | Urata et al. | 525/63 |

FOREIGN PATENT DOCUMENTS

| | | |
|---|---|---|
| EP | 286409 | 10/1988 |
| EP | 0 286 409 B1 * | 6/1993 |
| EP | 0297555 B1 | 1/1994 |
| EP | 0517379 B1 | 6/1995 |
| EP | 0774500 B1 | 12/1998 |
| EP | 0874031 B1 | 6/2002 |
| GB | 2099001 A | 12/1982 |
| GB | 2273064 A | 6/1994 |
| WO | 2005/052078 | 6/2005 |

* cited by examiner

*Primary Examiner*—William P Fletcher, III
(74) *Attorney, Agent, or Firm*—Donald R. Palladino

(57) ABSTRACT

Methods for coating articles that include a plastic substrate are disclosed. Certain methods include the steps of (i) applying a composition that includes an adhesion promoting agent to at least a portion of the substrate by a first application technique, (ii) applying a composition that includes an adhesion promoting agent over at least a portion of the composition applied in step (i) by a second application technique that is different from the first application technique, and (iii) applying a protective and decorative coating system over at least a portion of the compositions applied in steps (i) and (ii). Systems for coating articles that include a plastic substrate are also disclosed.

15 Claims, No Drawings

METHODS AND SYSTEMS FOR COATING ARTICLES HAVING A PLASTIC SUBSTRATE

FIELD OF THE INVENTION

The present invention relates to methods and systems for coating articles having a plastic substrate, such as certain interior and exterior parts on automobiles. More particularly, the methods and systems of the present invention involve the application of compositions that include an adhesion promoting agent to such articles.

BACKGROUND OF THE INVENTION

Plastics are used in a wide variety of molding applications for the preparation of molded articles for use in the automotive, industrial and appliance markets, among others. Vehicles, for example, include many interior and exterior parts and attachments that are constructed from plastics, such as mirror casings, fenders, bumper covers, spoilers, dashboards, interior trim, etc. The preparation of such articles generally includes the steps of molding an article from a polyolefin or other resin and applying to the molded article one or more film-forming coating layers to protect and/or color the article.

One of the difficulties associated with the use of plastic substrates is that typical film-forming compositions used for protective and decorative coatings do not adhere well to such substrates. A solution to this problem is to include a layer of a composition that includes an adhesion promoting material, such as a chlorinated polyolefin ("CPO"), between the substrate and the film-forming coating.

In refinishing molded articles constructed from plastics, for example, the need to include a layer of a composition that includes an adhesion promoting material can make the refinishing process complex, time-consuming, and expensive. Historically, the refinishing of such articles, such as automobile parts, has involved several steps. First, the surface to be refinished is cleaned, such as with a detergent, and allowed to dry. Second, the surface is wiped with a solvent, such as an alcohol. Third, the surface is scuffed, often using sandpaper or an abrasive pad to promote mechanical adhesion of subsequent materials. The scuffing step sometimes includes the addition of a sanding paste. Fourth, the surface is rinsed with water and allowed to dry. Fifth, the surface is wiped with a solvent to, for example, remove dust, oil, fingerprints, etc. Sixth, the surface is wiped or sprayed with a composition containing an antistatic agent, which is then flashed to remove solvents from the composition. Next, a material containing a CPO is sprayed onto the surface and then flashed to remove solvents from the material. Finally, a protective and decorative coating system is applied to the surface and cured.

As is apparent, such refinishing processes are complex, can generate a significant amount of waste, and can be very labor intensive and time-consuming. Moreover, because a CPO is applied in only one step, usually by spray application, such processes can sometimes result in inconsistent adhesion results, particularly in an automobile body shop setting, because there is a significant possibility that a portion of the surface to be refinished is not covered by a sufficient amount of adhesion promoting material.

As a result, there is a need for improved methods and systems for coating articles having a plastic substrate.

SUMMARY OF THE INVENTION

In one respect, the present invention is directed to methods of coating articles comprising a plastic substrate. In certain embodiments, the methods comprise the steps of (a) applying a composition comprising an adhesion promoting agent to at least a portion of the substrate by a first application technique; (b) applying a composition comprising an adhesion promoting agent over at least a portion of the composition applied is step (a) by a second application technique that is different from the first application technique; and (c) applying a protective and decorative coating system over at least a portion of the compositions applied is steps (a) and (b).

In other embodiments, the methods for coating an article comprising a plastic substrate comprise the steps of (a) applying a composition comprising an adhesion promoting agent to at least a portion of a plastic substrate by a first application technique; and (b) applying a protective and decorative coating system over at least a portion of the composition applied in step (a), wherein the protective and decorative coating system comprises a coating layer deposited from a coating composition that comprises an (i) adhesion promoting agent comprising a halogenated polyolefin, and (ii) a resin that is compatible with the adhesion promoting agent, wherein the coating layer is deposited by an application technique that is the same as or different from the first application technique.

In yet other embodiments, the methods of the present invention comprise the steps of (a) applying a first composition comprising an adhesion promoting agent to at least a portion of the substrate; (b) applying a second composition comprising an adhesion promoting agent over at least a portion of the composition applied in step (a); and (c) applying a protective and decorative coating system over at least a portion of the compositions applied in steps (a) and (b), wherein the first and second compositions are different and wherein at least one of the first and second compositions is applied to the substrate by wiping or wherein one of the compositions comprising an adhesion promoting agent is applied by wiping and the other is applied by spraying.

In another respect, the present invention is directed to systems for coating articles having a plastic substrate. These systems of the present invention comprise: (a) means for applying a composition comprising an adhesion promoting agent to at least a portion of the substrate by a first application technique; (b) means for applying a composition comprising an adhesion promoting agent to the substrate by a second application technique that is different from the first application technique; and (c) means for applying a protective and decorative coating system to at least a portion of the substrate. In some embodiments, certain elements of these systems may be provided in the form of a kit.

DETAILED DESCRIPTION OF EMBODIMENTS OF THE INVENTION

For purposes of the following detailed description, it is to be understood that the invention may assume various alternative variations and step sequences, except where expressly specified to the contrary. It is also to be understood that the specific devices and processes described in the following specification are simply exemplary embodiments of the invention. Hence, any specific dimensions or other physical characteristics related to the embodiments disclosed herein are not to be considered as limiting. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The present invention is directed to methods and systems for coating articles comprising a plastic substrate, such as certain interior and exterior parts on automobiles. In certain embodiments, the methods of the present invention comprise the steps of (a) applying a composition comprising an adhesion promoting agent to at least a portion of the substrate by a first application technique; (b) applying a composition comprising an adhesion promoting agent over at least a portion of the composition applied in step (a) by a second application technique that is different from the first application technique; and (c) applying a protective and decorative coating system over at least a portion of the compositions applied in steps (a) and (b).

As indicated, the methods and systems of the present invention are directed to coating articles comprising a plastic substrate. In certain embodiments, such coating methods and systems are directed to the refinishing of such articles. As used herein, the term "refinish" refers to the act of redoing, restoring or repairing the surface or finish of an article or, in the case of automobile repairs, for example, the preparation of the surface or finish of a unused article in connection with such a repair. As used herein, the term "plastic substrate" refers to a substrate having, on at least a portion of its surface, a plastic. As used herein, the term "plastic" is intended to include any thermoplastic or thermosetting synthetic nonconductive material used in injection or reaction molding, sheet molding or other similar processes whereby parts are formed, such as, for example, acrylonitrile butadiene styrene ("ABS"), thermoplastic polyolefin ("TPO"), polycarbonate, thermoplastic elastomer, polyester thermoset, polyurethane, thermoplastic polyurethane, sheet molded compound, fiberglass reinforced polyester, among others. As used herein, the term "olefin" and like terms refers to unsaturated aliphatic hydrocarbons having one or more double bonds, such as those obtained by cracking petroleum fractions. Specific examples of olefins include, but are not limited to, propylene, 1-butene, 1,3-butadiene, isobutylene and diisobutylene. As used herein, the term "polyolefin" and like terms refers to a polymer formed from olefins. Common examples are polypropylene and polybutylene and include the class of TPOs. As used herein, the term "polymer" refers to oligomers and both homopolymers and copolymers.

In certain embodiments, the methods of the present invention comprise the step of applying a composition comprising an adhesion promoting agent to at least a portion of the substrate by a first application technique. As used herein, the term "adhesion promoting agent" includes any adhesion promoting or adhesion improving material known to those of skill in the art of formulating materials for coating plastic articles. Examples of such materials include, without limitation, halogenated polyolefin polymers, such as CPOs or polyolefins that include one or more other halogen atoms, such as fluorine, chlorine, bromine, or iodine.

CPO resins, for example, can be produced by ionic polymerization or Ziegler-Natta polymerization according to well-known techniques, such as that reviewed in Billmeyer, "Textbook of Polymer Science," p. 311-325, Wiley-Interscience, New York, N.Y., 1962. Polyolefin resins that can be used to produce CPO resins include, for example, polyethylene, polypropylene, polybutylene, polyisoprene, polybutadiene and mixtures thereof.

The crystallinity of the polyolefin can be adjusted by choosing a specific stereoisomer of the polymer. Isotactic polymers (in which all side groups are arranged on one side of the polymer backbone), syndiotactic polymers (in which side groups are arranged alternately above and below the plane of the polymer backbone), or atactic polymers (in which side groups are arranged randomly about the plane of the polymer backbone) can be used to prepare CPOs. In addition, the crystallinity of the polyolefin can also be adjusted by varying the amount of chlorine in the backbone. Generally, as the chlorine content rises, the crystallinity of the polymer decreases and the solubility of the polymer in various solvents, including water, increases.

A solvent is sometimes used in preparing a polyolefin resin. Suitable solvents include, for example, aliphatic hydrocarbons such as hexane or heptane; aromatic hydrocarbons such as cyclohexane, toluene, or xylene; alcohols such as isopropanol, butanol, 2-ethylhexanol or propylene glycol; ethers such as the monoethyl, monobutyl or monohexyl esters of ethylene glycol or diethylene glycol; esters such as butyl acetate, ethyl acetate, 2-ethylhexyl acetate, or ethyl-3-ethoxy propionate; and ketones such as isophorone, 4-methoxy-pentanone, diisobutyl ketone, or methyl isobutyl ketone; and the like.

Polyolefin resins can be chlorinated by solution, melt or solid polymer chlorination at moderate to high temperatures according to well-known techniques as reviewed, for example, in Raff and Doak, "Crystalline Olefin Polymers II," p. 239-260, Interscience Publishers, New York, N.Y., 1964. For example, a suitable CPO resin can be prepared by bubbling chlorine gas through a hot solution of polyolefin in benzyl chloride, or by irradiating a solution of polyolefin in carbon tetrachloride with ultraviolet light.

As will be appreciated by the skilled artisan, CPO resins can be unstable and dechlorinate upon irradiation or exposure to elevated temperatures. Consequently, the exact chlorine level of a CPO resin can vary over time or from batch to batch. In certain embodiments of the present invention, the CPO resins used to prepare the composition applied by the first application technique may contain from about 0.50 percent to about 70 percent chlorine, the percentages based on the weight of polyolefinic material present. In certain embodiments, the chlorine content is from about 10 percent to about 50 percent, or, in some embodiments, from about 20 percent to about 35 percent by weight. In certain embodiments, the chlorine is randomly present on the polyolefinic backbone.

The dechlorination reaction that CPO resins are subjected to produces hydrochloric acid that may, if desired, be removed by a scavenger. Examples of materials which can be used as scavengers include organic metal compounds such as dibutyl tin dilaurate, stannous octoate or dibutyl tin oxide; or epoxy resins such as epoxidized linseed oil, or polyglycidyl ethers of polyphenols such as, for example, BISPHENOL A, which is commerically available from Shell Corporation.

CPOs suitable for use in the composition applied by the first application technique in certain methods of the present invention may, in certain embodiments, have a weight average molecular weight ranging from about 10,000 to about 150,000, such as about 20,000 to about 125,000, such as about 25,000 to about 105,000. as determined by gel permeation chromatography using a polystyrene standard. Examples of suitable CPOs are disclosed In U.S. Pat. Nos. 6,593,423; 4.997,882; 5,319,032; and 5,397,602, herein incorporated by reference. Suitable CPOs for use in the methods and systems of the present invention include materials commercially available from Eastman Chemical Products, Inc.. of Rochester, N.Y. For example, CPOs available from Eastman Chemicals under the names CP1 53-2; CP164-1, CP343-1, CP343-3 and CP515-2 maybe used. In addition, the HARDLEN® CPO adhesion promoters available from Toyo Kasai Kogyo Co., Ltd., of Osaka, Japan may be used.

In certain embodiments, the composition applied by the first application technique in certain methods of the present invention comprises a halogenated polyolefin that is modified by grafting a compatibilizing material onto the polyolefin. For example, the composition applied by the first application technique in certain methods of the present invention may comprise a CPO, such as those described earlier, with an acrylic monomer grafted thereon. In other embodiments, the composition applied by the first application technique may comprise an epoxy or polyester modified CPO, among others. As used herein, the term "compatibilizing material" refers to moieties that modify a halogenated polyolefin so as to render the halogenated polyolefin compatible with other resin(s) that may be present in the composition. By "compatible" it is meant herein that the halogenated polyolefin and such other resins do not separate from each other in the composition. As will be understood by those skilled in the art, the specific chemistry of the compatibilizing material may depend on the chemistry of the composition into which the halogenated polyolefin is sought to be added. It should be understood, however, that even where the composition applied by the first application technique comprises a halogenated polyolefin that is modified by grafting a compatibilizing material onto the polyolefin, other resins need not necessarily be present in the composition.

As mentioned earlier, in certain methods of the present invention, the composition applied by the first application technique comprises a CPO having an acrylic monomer grafted thereon. Particular examples of acrylic monomers that may be grafted onto a halogenated polyolefin to produce a modified halogenated polyolefin suitable for use in the present invention include, without limitation, acrylic acid, methacrylic acid, and esters thereof, such as acrylates and methacrylates. Useful esters of acrylic or methacrylic acid include straight chain or branched alkyl or hydroxyalkyl esters of acrylic or methacrylic acid. Useful alkyl esters can contain about 1 to about 24 carbon atoms, and preferably contain about 1 to about 18 carbon atoms. Non-limiting examples of alkyl esters include methyl (meth)acrylate, ethyl (meth)acrylates, propyl (meth)acrylates, butyl (meth)acrylates, pentyl (meth)acrylates, hexyl (meth)acrylates, heptyl (meth)acrylates, octyl (meth)acrylates, nonyl (meth)acrylates, decyl (meth)acrylates, dodecyl (meth)acrylates, tetradecyl (meth)acrylates, hexadecyl (meth)acrylates, ethylhexyl (meth)acrylates, lauryl (meth)acrylates, stearyl (meth)acrylates and 2-ethylhexyl (meth)acrylate. Suitable hydroxyalkyl esters include 2-hydroxyethyl (meth)acrylate, 2-hydroxypropyl (meth)acrylate, 3-hydroxypropyl (meth)acrylate and hydroxybutyl (meth)acrylate. As used herein, "(meth)acrylate" and terms derived therefrom are intended to include both acrylate and methacrylate.

In certain embodiments, modified halogenated polyolefins suitable for use in the methods and systems of the present invention may be produced by an atom transfer radical polymerization process (ATRP), such as is described in U.S. Pat. No. 6,576,722 at col. 3, line 61 to col. 10, line 17, which is incorporated herein by reference.

In certain embodiments, modified halogenated polyolefins suitable for use in the methods and systems of the present invention may be produced by conventional free radical polymerization methods that will be understood by those skilled in the art. See Kirk-Othmer Encyclopedia of Chemical Technology, Vol. 1 (1963). As will be understood by the skilled artisan, such radical polymerization is typically conducted in a solution of organic solvent(s). For example, aromatic solvents, such as toluene, xylene and SOLVESSO 100 may be used. Moreover, conventional radical reaction initiators may be used, such as peroxides, including benzoyl peroxide, lauroyl peroxide, t-butyl hydroperoxide, and t-butylperoxy-2-ethylhexanoate; and azo compounds, including azobisvaleronitrile, azobisisobutylronitrile and azobis(2-methylpropionitrile).

It will be appreciated by the skilled artisan that the compounds produced by a conventional free radical polymerization process will typically comprise a mixture of polymers. For example, when grafting an acrylic monomer onto a CPO by conventional free radical polymerization, the random nature of standard radical polymerization will likely produce a resin composition comprising a mixture of non-graft CPO chains, acrylic polymers, and CPOs having an acrylic monomer grafted thereon. Nevertheless, such a polymerization will produce at least some of the modified halogenated polyolefins that may be used in the methods and systems of the present invention. Thus, in certain embodiments, the adhesion promoting agent comprises a mixture of a halogenated polyolefin, an acrylic polymer, and a modified halogenated polyolefin. In these embodiments, the modified halogenated polyolefin may, for example, comprise 1 to 50 percent by weight based on the total weight of the adhesion promoting agent. In such embodiments, the amount of modified halogenated polyolefin that may be present in the adhesion promoting agent can range between any combination of the recited values, inclusive of the recited values.

In certain embodiments, the adhesion promoting agent comprises 1 to 10 percent by weight or, in some embodiments, 1 to 5 percent by weight, or, in yet other embodiments, 1 to 2 percent by weight of the composition applied by the first application technique in certain methods of the present invention based on the total weight of the composition. In such embodiments, the amount of adhesion promoting agent present in the composition applied by the first application technique can range between any combination of the recited values, inclusive of the recited values.

In addition to the adhesion promoting agent, the composition applied by the first application technique in certain methods of the present invention may also comprise a solvent In certain embodiments, the composition applied by the first application technique comprises a solvent that is an organic solvent or a mixture of organic solvent and an aqueous medium. Suitable organic solvents include, without limitation, xylene, toluene, AROMATIC 100 solvent, which is commercially available from Cumberland Products, Inc., Hodgenville, Ky., and alcohols, such as ethyl alcohol, propyl alcohol and diacetone alcohol, including mixtures thereof.

In certain embodiments, the organic solvent comprises 80 to 99 percent by weight or, in some embodiments 95 to 99 percent by weight, or, in yet other embodiments 98 to 99 percent by weight of the composition applied by the first application technique in certain methods of the present invention based on the total weight of the composition. In such embodiments, the amount of organic solvent that may be present in the composition applied by the first application technique can range between any combination of the recited values, inclusive of the recited values.

In certain embodiments, the composition applied by the first application technique may also comprise one or more antistatic agents, such as ethoxylated amines. alkanolamides, quaternary ammonium compounds, and mixtures thereof. Specific examples include quaternary ammonium ethosuiphate, such as CATAFOR CA 80, commercially available from Aceto Corporation, Lake Success. N.Y., and the LAROSTAT® line of antistatic additives commercially available from BASF Corporation.

In certain embodiments, the antistatic agent comprises 0.1 to 5.0 percent by weight or, in some embodiments 0.5 to 2.0 percent by weight, or, in yet other embodiments 1 to 2 percent by weight of the composition applied by the first application technique in certain methods of the present invention based on the total weight of the composition. In such embodiments, the amount of antistatic agent present in the composition applied by the first application technique can range between any combination of the recited values, inclusive of the recited values.

In certain embodiments, the solvent included in the composition applied by the first application technique in certain methods of the present invention comprises an aqueous medium. In these embodiments, the composition applied by the first application technique may comprise an emulsion wherein the adhesion promoting agent and any organic solvent that may be present in the composition are dispersed in a continuous phase that comprises an aqueous medium.

As will be appreciated by those skilled in the art, in such emulsions, the intended ingredients of the dispersion, including the adhesion promoting agent, can be dispersed in the aqueous medium with a dispersing means such as a homogenizer. In these embodiments, the adhesion promoting agent may be adapted to a form that will admit it to the dispersing means. For example, the adhesion promoting agent may be in the form of a solution or is dissolved with an organic solvent or a mixture of organic solvents to make up an organic component that is introduced into an aqueous medium in the presence of a stabilizer. The resultant mixture can be described as an emulsion.

The stabilizer can be a surfactant, such as an anionic, cationic and/or a nonionic surfactant, or a mixture thereof. Suitable surfactants include those that are described in the Kirk Othmer Encyclopedia of Chemical Technology, Third Edition, Volume 22, pages 332 to 432. Suitable anionic surfactants include carboxylic acids and their salts, sulfonic acids and their salts, sulfuric acid esters and their salts, phosphoric and polyphosphoric acid esters and their salts; suitable nonionic surfactants include ethoxylated alcohols, ethoxylated alkylphenols, ethoxylated carboxylic esters, ethoxylated carboxylic amides, and fluorosurfactants; and suitable cationic surfactants include oxygen-free amines, oxygen-containing amines, amide-linked amines, and quaternary ammonium salts.

In certain embodiments, the composition applied by the first application technique in certain methods of the present invention comprises 0.1 to 20.0 percent by weight or, in some embodiments 0.1 to 10.0 percent by weight, or, in yet other embodiments, 0.1 to 2.0 percent by weight of stabilizer based on the total weight of the material. In such embodiments, the amount of stabilizer present in the composition applied by the first application technique can range between any combination of the recited values, inclusive of the recited values.

As mentioned earlier, the intended ingredients of the dispersion, including the adhesion promoting agent, can be dispersed in the aqueous medium with a dispersing means such as a homogenizer. In certain embodiments, the emulsion is particulated by subjecting it to stress by the dispersing means. The mixture is subjected to stress sufficient to produce microparticles which have a mean particle size diameter of, for example, about 0.01 to 10 micrometers, such as about 0.05 to 0.3 micrometers. Particle size can be measured with a particle size analyzer such as the Coulter N4 instrument commercially available from Coulter, as will be understood by those skilled in the art.

One mode of subjecting the mixture to the appropriate stress is by the use of a MICROFLUIDIZER® emulsifier that is available from Microfluidics Corporation in Newton, Mass. This emulsifier is described in U.S. Pat. No. 4,533,254, which is incorporated herein by reference. The device consists of a high pressure (up to 20,000 pounds per square inch "psi") pump and an interaction chamber wherein the emulsification takes place. The pump forces the mixture of ingredients in an aqueous medium into the chamber where it is split into at least two streams which pass at very high velocity through at least two splits and collide resulting in the particulation of the mixture into small particles. Generally, the mixture is passed through the emulsifier once at a pressure between 5,000 and 15,000 psi. Multiple passes can result in smaller average particle size and a narrower range for the particle size distribution. When using the aforesaid MICROFLUIDIZER® emulsifier, stress is applied by liquid impingement as has been described. However, it should be understood that, if desired, other modes of applying stress to the pre-emulsification mixture can be utilized, such as the use of ultrasonic energy.

Stress is described as a force per unit area. Although the precise mechanism by which the MICROFLUIDIZER® emulsifier stresses the pre-emulsification mixture to particulates is not thoroughly understood, it is theorized that stress is exerted in more than one manner. It is believed that one manner in which stress is exerted is by shear. "Shear" means that the force is such that one layer or plane moves parallel to an adjacent parallel plane. Stress can also be exerted from all sides as a bulk compression stress. In this instance, stress could be exerted without any shear. A further manner of producing intense stress is by cavitation. Cavitation occurs when the pressure within a liquid is reduced enough to cause vaporization. The formation and collapse of the vapor bubbles occurs violently over a short time period and produces intense stress. Although not intending to be bound by theory, it is believed that both shear and cavitation contribute to producing the stress which particulates the mixture.

In certain embodiments, the aqueous medium comprises 60 to 99 percent by weight or, in some embodiments 75 to 95 percent by weight, or, in yet other embodiments 90 to 98 percent by weight of the composition applied by the first application technique in certain methods of the present invention based on the total weight of the material. In such embodiments, the amount of aqueous medium present in the composition applied by the first application technique can range between any combination of the recited values, inclusive of the recited values.

The first application technique in certain methods of the present invention may comprise any of a variety of application techniques such as wiping, spraying, dipping, brushing, and flowing, among others. In certain embodiments, the first application technique comprises wiping. As used herein, the term "wiping" refers to the act of moving an object on the surface of a substrate with pressure and friction. In certain embodiments, the means for applying the composition comprising an adhesion promoting agent thafis applied by the first application. technique is an absorbent fibrous material. Non-limiting specific examples of such materials include, for example, a paper towel, a lint-free cloth, a sponge, a squeegee, or a UV wipe, among others. Commercially available products that are suitable for use as the absorbent fibrous material in the methods and systems of the present invention include the KIMTECH® Precision Wipes, commercially available from Kimberly-Clark Corporation, Neenah, Wis.

In certain embodiments, the composition comprising an adhesion promoting agent that is applied by the first application technique is applied by wiping the surface with an absorbent fibrous material loaded with such a composition. For example, an absorbent fibrous material may be loaded to saturation with such a composition by immersing the material into the composition. Then, the absorbent fibrous material may, if desired, be pressed with weight to squeeze out excess and control loading of the absorbent fibrous material.

In certain embodiments, the composition applied by the first application technique in the methods of the present invention is applied such that a film thickness of less than 0.2 mils (5 micrometers), such as 0.001 to 0.2 mils (0.025 to 5 micrometers), is formed on the substrate.

After applying the composition applied by the first application technique, the composition may be given a drying step in which solvent is driven out of the composition by heating or an air drying period before application of other compositions to the substrate. Suitable drying conditions will depend on the particulars of the composition applied by the first application technique, and on the ambient humidity if the composition comprises an aqueous medium, but, in certain embodiments, a drying time of from 1 to 15 minutes, such as about 5 minutes, at a temperature of 75° to 200° F. (21° to 93° C.) will be sufficient.

In certain embodiments, the methods of the present invention also comprise the step of cleaning the substrate prior to applying any composition comprising an adhesion promoting agent to the substrate. As used herein, the term "cleaning" refers to the removal of unwanted foreign matter from the surface, such as soil, dirt, cutting oils, waxes, finger oils, sanding dust, among other things. In certain embodiments, the substrate may be cleaned by, for example, mechanically separating the unwanted matter from the substrate, dissolving the unwanted foreign matter, contacting the substrate with a detergent, or a mixture of two or more of these methods.

As used herein, the term "detergent" refers to a substance that reduces the surface tension of water; i.e., a surface-active agent, i.e., a surfactant, which concentrates at oil-water interfaces, exerts emulsifying action, and aids in removing contaminants from a surface. Examples of detergents that might be used in the practice of the present invention include, without limitation, the anionic, nonionic, and cationic surfactants described earlier, as well as soaps. In certain embodiments, the detergent comprises d-Limonene, an oil extracted from citrus rind.

In certain embodiments, the detergent is present in a cleaning composition. In these embodiments, the detergent may, for example, comprise 0.01 to 10.0 percent by weight or, in some embodiments 0.1 to 0.5 percent by weight, or, in yet other embodiments 0.1 to 0.3 percent by weight of the cleaning composition based on the total weight thereof. In such embodiments, the amount of detergent present in the cleaning composition can range between any combination of the recited values, inclusive of the recited values.

In certain embodiments, the step of cleaning the substrate comprises contacting the substrate with an object, such as a pad or sponge, having a cleaning composition comprising a detergent in contact with or absorbed therein. In certain embodiments, the step of cleaning the substrate comprises contacting the substrate with an abrasive material having a cleaning composition comprising a detergent contained therein. Abrasive materials suitable for use in the methods and systems of the present invention are commercially available and include, for example, SCOTCH-BRITE® Scuff Sponges, commercially available from 3M Company, St. Paul, Minn., and BEAR-TEX® Scuff Pads and Sponges, commercially available from Norton Abrasives.

In certain embodiments, the cleaning step comprises wiping the surface with an abrasive material loaded with a cleaning composition, such as the compositions described above. For example, an abrasive material may be loaded to saturation with such a composition by immersing the abrasive material into the composition. Then, the abrasive material may, if desired, be pressed with weight to squeeze out excess cleaning composition and control loading of the absorbent fibrous material. Indeed, one of the advantages of certain embodiments of the present invention is that, by loading an abrasive material with a cleaning composition, the cleaning and scuffing steps of a coating process can be performed simultaneously.

In certain embodiments, the substrate is rinsed with water after the cleaning step and then dried. The drying step may, for example, simply be sufficient to remove most of the rinse water from the substrate, though the water need not necessarily be removed in its entirety. The substrate may be dried by any technique, such as wiping with a cloth, blow-drying, or simply air-drying, among other methods.

In certain embodiments, the step of cleaning the substrate comprises treating the substrate, such as by corona treatment or similar treatments, to oxidize materials from the surface of the substrate prior to applying the compositions comprising an adhesion promoting agent.

As mentioned earlier, certain methods of the present invention also comprise the step of applying a composition comprising an adhesion promoting agent to the substrate by a second application technique that is different from the first application technique. In these methods, the composition applied by the second application technique is applied at least partially over the composition applied by the first application technique.

In certain methods of the present invention, the adhesion promoting agent that is present in the composition applied by the second application technique may include any of the adhesion promoting agents described earlier with respect to the composition applied by the first application technique, such as halogenated polyolefins and halogenated polyolefins modified by grafting a compatibilizing material thereon, including mixtures thereof. The adhesion promoting agent present in the composition applied by the second application technique may be the same as or different from the adhesion promoting agent present in the composition applied by the first application technique. In certain embodiments, the composition applied by the second application technique may also include any of the other materials identified above that may be present in the composition applied by the first application technique.

In certain embodiments, the composition comprising an adhesion promoting agent that is applied by the second application technique in certain methods of the present invention is different than the composition comprising an adhesion promoting agent applied by the first application technique. For example, in certain embodiments, the adhesion promoting agent comprises 1 to 50 percent by weight or, in some embodiments, 1 to 20 percent by weight, or, in yet other embodiments, 1 to 5 percent by weight of the composition applied by the second application technique in certain methods of the present invention based on the total weight of the composition. In such embodiments, the amount of adhesion promoting agent present in the composition applied by the second application technique can range between any combination of the recited values, inclusive of the recited values.

The second application technique may comprise any of a variety of application techniques such as those that were identified earlier with respect to the first application technique. In certain embodiments, the second application technique comprises spraying. Moroever, in certain embodiments, the composition comprising an adhesion promoting agent that is applied by the second application technique in certain methods of the present invention is present in the form of a aerosol. In these embodiments, the composition comprises a suspension of the adhesion promoting agent in a gas, i.e., a propellant. In certain embodiments, the means for applying the composition comprising an adhesion promoting agent that is applied by the second application technique in certain methods and systems of the present invention comprises a spray gun, such as high volume—low pressure (HVLP), airless, air assisted airless, and electrostatic enhanced spray guns, among others.

In other embodiments, the means for applying the composition comprising an adhesion promoting agent that is applied by the second application technique in certain methods and systems of the present invention comprises a pressurized container containing the composition in aerosol form as described above. In these embodiments, the propellant may comprise 10 to 50 percent by weight or, in some embodiments, 20 to 40 percent by weight, or, in yet other embodiments, 25 to 35 percent by weight of the composition applied by the second application technique based on the total weight of the composition. In such embodiments, the amount of propellant present in the composition applied by the second application technique can range between any combination of the recited values, inclusive of the recited values.

In certain embodiments, the composition applied by the second application technique is applied such that a film thickness of less than 0.2 mils (5 micrometers), such as 0.001 to 0.2 mils (0.025 to 5 micrometers), is formed on the substrate. After applying the composition applied by the second application technique, the composition may be given a drying step, such as that described earlier with respect to the composition applied by the first application technique.

The methods of the present invention also comprise the step of applying a protective and decorative coating system to at least a portion of the substrate, wherein the coating system is applied at least partially over at least one of the composition(s) described earlier.

Protective and decorative coating systems that may be used in the methods of the present invention include, for example, those protective and decorative coating systems that are conventionally used in automotive refinish coating applications and automotive OEM applications, among others. Examples of suitable protective and decorative coating systems that may be applied in accordance with the methods of the present invention include single layer coating systems, such as pigmented direct gloss coating systems, and multi-layered systems, such as systems that include a pigmented basecoat layer and a clear top coating layer. Such coating systems may also include a primer layer, as will be understood by those skilled in the art.

In certain embodiments, one or more layers of the protective and decorative coating system may be deposited from a coating composition that includes a thermosetting polymeric composition. As used herein, the term "thermosetting" refers to polymeric compositions that "set" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents. In other embodiments, one or more layers of the protective and decorative coating system may be deposited from a coating composition that includes a thermoplastic polymeric composition. As used herein, the term "thermoplastic" refers to polymeric compositions that comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

In certain embodiments, one or more layers of the protective and decorative coating system may be deposited from a liquid composition that includes a polymeric composition and a diluent, that is, waterborne or solventborne systems. Suitable diluents include organic solvents, water, and water/organic solvent mixtures. Organic solvents in which such polymeric compositions may be dispersed include, for example, alcohols, ketones, aromatic hydrocarbons, glycol ethers, esters, and mixtures thereof. The diluent is sometimes present in amounts ranging from 5 to 80 weight percent based on the total weight of the compositions, such as 30 to 50 weight percent.

In certain embodiments, one or more layers of the protective and decorative coating system may be deposited from a coating composition that includes a polymeric composition that includes, without limitation, hydroxyl or carboxylic acid-containing acrylic copolymers, hydroxyl or carboxylic acid-containing polyester polymers and oligomers, isocyanate or hydroxyl-containing polyurethane polymers, and/or amine or isocyanate-containing polyureas.

Acrylic polymers, if used, are typically copolymers of acrylic acid or methacrylic acid or hydroxyalkyl esters of acrylic or methacrylic acid such as hydroxyethyl methacrylate or hydroxypropyl acrylate with one or more other polymerizable ethylenically unsaturated monomers such as alkyl esters of acrylic acid including methyl methacrylate and 2-ethyl hexyl acrylate, and vinyl aromatic compounds such as styrene, alpha-methyl styrene and vinyl toluene. The ratio of reactants and reaction conditions are selected to result in an acrylic polymer with pendant hydroxyl or carboxylic acid functionality.

Besides acrylic polymers, one or more layers of the protective and decorative coating system may be deposited from a coating composition that includes a polymeric composition that includes a polyester polymer or oligomer. Such polymers may be prepared in a known manner by condensation of polyhydric alcohols and polycarboxylic acids. Suitable polyhydric alcohols include, for example, ethylene glycol, neopentyl glycol, trimethylol propane and pentaerythritol.

Suitable polycarboxylic acids include, for example, adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters may be used. Also, small amounts of monocarboxylic acids such as stearic acid may be used.

Hydroxyl-containing polyester oligomers can be prepared by reacting an an hydride of a dicarboxylic acid such as hexahydrophthalic anhydride with a diol such as neopentyl glycol in a 1:2 molar ratio.

Where it is desired to enhance air-drying, suitable drying oil fatty acids may be used and include, for example, those derived from linseed oil, soya bean oil, tall oil, dehydrated castor oil or tung oil, among others.

The polyesters may, for example, contain free terminal hydroxyl and/or carboxyl groups that are available for further crosslinking reactions.

Polyurethane polymers containing terminal isocyanate or hydroxyl groups may also be present in the coating compositions from which one or more layers of the protective and decorative coating systems are deposited. Polyurethane polyols or NCO-terminated polyurethanes that can be used include, for example, those prepared by reacting polyols including polymeric polyols with polyisocyanates. The polyurea-containing terminal isocyanate or primary or secondary amine groups which can be used include, for example, those prepared by reacting polyamines including polymeric polyamines with polyisocyanates. The hydroxyl/isocyanate or amine/isocyanate equivalent ratio is adjusted and reaction conditions selected to obtain the desired terminal group. Examples of suitable polyisocyanates include those described in U.S. Pat. No. 4,046,729 at column 5, line 26 to column 6, line 28, incorporated herein by reference. Examples of suitable polyols include those described in U.S. Pat. No. 4,046,729 at column 7, line 52 to column 10, line 35, incorporated herein by reference. Examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

In certain embodiments, one or more layers of the protective and decorative coating system may be deposited from a curable coating composition that includes a curing agent, such as aminoplast resins and phenoplast resins and mixtures thereof, as curing agents for OH and COOH, and amide and carbamate functional group containing materials. Examples of aminoplast and phenoplast resins suitable as curing agents in such curable compositions include those described in U.S. Pat. No. 3,919,351 at col. 5, line 22 to col. 6, line 25, incorporated herein by reference.

Polyisocyanates and blocked polyisocyanates as curing agents for OH and primary and/or secondary amino group containing materials are well known in the art. Examples of suitable polyisocyanates and blocked isocyanates include those described in U.S. Pat. No. 4,546,045 at col. 5, lines 16 to 38; and in U.S. Pat. No. 5,468,802 at col. 3, lines 48 to 60, both incorporated herein by reference.

Anhydrides as curing agents for OH and primary and/or secondary amino group containing materials are well known in the art. Examples of suitable anhydrides include those described in U.S. Pat. No. 4,798,746 at col. 10, lines 16 to 50 and in U.S. Pat. No. 4,732,790 at col. 3, lines 41 to 57, both incorporated herein by reference.

Polyepoxides as curing agents for COOH functional group containing materials are well known in the art. Examples of suitable polyepoxides include those described in U.S. Pat. No. 4,681,811 at col. 5, lines 33 to 58, incorporated herein by reference.

Polyacids as curing agents for epoxy functional group containing materials are well known in the art. Examples of suitable polyacids include those described in U.S. Pat. No. 4,681,811 at col. 6, line 45 to col. 9, line 54, incorporated herein by reference.

Polyols, that is, a material having an average of two or more hydroxyl groups per molecule, can be used as curing agents for NCO functional group containing materials and anhydrides and esters and are well known in the art. Examples of suitable polyols include those described in U.S. Pat. No. 4,046,729 at col. 7, line 52 to col. 8, line 9; col. 8, line 29 to col. 9, line 66 and in U.S. Pat. No. 3,919,315 at col. 2, line 64 to col. 3, line 33, both incorporated herein by reference.

Polyamines can also be used as curing agents for NCO functional group containing materials and for carbonates and unhindered esters and are well known in the art. Examples of suitable polyamines include those described in U.S. Pat. No. 4,046,729 at col. 6, line 61 to col. 7, line 26, incorporated herein by reference.

In certain embodiments, one or more layers of the protective and decorative coating system may be deposited from a coating composition that includes, in addition to the components described above, a variety of other adjuvant materials. If desired, other polymeric compositions can be utilized in conjunction with the polymeric compositions described above so long as the resultant coating composition is not detrimentally affected in terms of application, physical performance and appearance properties.

In certain embodiments, one or more layers of the protective and decorative coating system may be deposited from a coating composition that includes a catalyst to accelerate the cure reaction. Examples of suitable catalysts include organo-tin compounds such as dibutyl tin dilaurate, dibutyl tin oxide and dibutyl tin diacetate. Catalysts suitable for promoting the cure reaction between an aminoplast curing agent and the reactive hydroxyl and/or carbamate functional groups of the thermosettable dispersion include acidic materials, for example, acid phosphates such as phenyl acid phosphate, and substituted or unsubstituted sulfonic acids such as dodecylbenzene sulfonic acid or paratoluene sulfonic acid.

In certain embodiments, one or more layers of the protective and decorative coating system may be deposited from a coating composition that includes one or more other additive ingredients, including those which are well known in the art of formulating surface coatings, such as dyes, pigments, surfactants, flow control agents, thixotropic agents, fillers, antigassing agents, organic co-solvents, catalysts, and other customary auxiliaries. Examples of these materials and suitable amounts are described in U.S. Pat. Nos. 4,220,679, 4,403,003, 4,147,769 and 5,071,904, which are incorporated herein by reference.

In certain embodiments, a protective and decorative coating system is applied to the substrate, wherein the coating system comprises a coating layer deposited from a coating composition that comprises an adhesion promoting agent. Such a composition includes a resin that is compatible with the adhesion promoting agent and may be applied by any suitable application technique. In these embodiments, the composition may comprise a halogenated polyolefin that is modified by grafting a compatibilizing material onto the polyolefin as described above. For example, if a primer layer is present in the protective and decorative coating system, then the composition from which such a layer is deposited may include such an adhesion promoting agent. On the other hand, if such a layer is not present, the adhesion promoting agent may be present in the basecoat of a multi-layered coating system or it may be present in the composition from which the single coat of a single layer coating system is deposited. In certain embodiments, the adhesion promoting agent may be present in more than one layer of the protective and decorative coating system.

Therefore, certain methods of the present invention comprise the steps of (a) applying a composition comprising an adhesion promoting agent to at least a portion of a plastic substrate by a first application technique; and (b) applying a protective and decorative coating system over at least a portion of the composition applied in step (a). In these methods of the present invention, the protective and decorative coating system comprises a coating layer deposited from a coating composition that comprises an (i) adhesion promoting agent comprising a halogenated polyolefin that, in certain embodiments, may be modified by grafting a compatibilizing material onto the polyolefin, and (ii) a resin that is compatible with the adhesion promoting agent. Such resins may include any of the thermosetting or thermoplastic polymeric compositions described earlier. Moreover, such a coating layer may be deposited by an application technique that is the same as or different from the first application technique.

In certain embodiments, a coating layer of the protective and decorative coating system is deposited from a composition that comprises 0.1 to 20.0 percent by weight, or, in some cases, 0.1 to 10.0 percent by weight, or, in other embodiments, 1.0 to 5.0 percent by weight of the adhesion promoting agent based on the total weight of the composition. The amount of the adhesion promoting agent present in such coating compositions may range between any combination of these values, inclusive of the recited values.

The coating compositions from which one or more layers of the protective and decorative coating system are deposited may be applied by any conventional coating technique, such as brushing, spraying, dipping, or flowing, among others. In certain embodiments, such compositions are applied by spraying. Moroever, in certain embodiments, the means for applying such compositions comprises a spray gun, such as those that were described earlier, or an aerosol can.

As will be appreciated by the foregoing description, the present invention is also directed to methods for coating articles having a plastic substrate, which comprise the steps of (a) applying a first composition comprising an adhesion promoting agent to at least a portion of the substrate; (b) applying a second composition comprising an adhesion promoting agent over at least a portion of the composition applied in step (a); and (c) applying a protective and decorative coating system over at least a portion of the composition applied in steps (a) and (b). In these embodiments, the first and second compositions are different and at least one of the compositions comprising an adhesion promoting agent may be applied to the substrate by wiping. Moreover, in certain embodiments, one of the compositions comprising an adhesion promoting agent may be applied by wiping and the other may be applied by spraying.

As will also be appreciated by the foregoing description, the present invention is also directed to systems for coating articles having a plastic substrate. In certain embodiments, the systems of the present invention comprise: (a) means for applying a composition comprising an adhesion promoting agent to at least a portion of the substrate by a first application technique; (b) means for applying a composition comprising an adhesion promoting agent to the substrate by a second application technique that is different from the first application technique; and (c) means for applying a protective and decorative coating system to at least a portion of the substrate.

In certain embodiments, certain elements of the systems of the present invention may be provided in the form of a kit. For example, the kit may comprise a cleaning tool, such as an abrasive material having a detergent contained therein as described earlier, and a means for applying a composition comprising an adhesion promoting agent to at least a portion of the substrate by a first application technique, such as the absorbent fibrous material comprising such a composition, as described earlier. In addition, the kit may also include a means for applying a composition comprising an adhesion promoting agent to at least a portion of the substrate by a second application technique, such as the spray gun or pressurized container containing the composition in aerosol form as described earlier.

The present invention provides methods and systems for coating articles comprising a plastic substrate. Such methods can be less complex, wasteful, labor intensive, and/or time-consuming as compared to prior art methods of coating articles having a plastic substrate. Moreover, because an adhesion promoting agent is applied in more than one step of the coating methods and systems of the present invention, these methods and systems can, in certain cases, provide more consistent adhesion results as compared to prior art coating methods, particularly in a body shop setting.

Illustrating the invention are the following examples, which, however, are not to be considered as limiting the invention to their details. Unless otherwise indicated, all parts and percentages in the following examples, as well as throughout the specification, are by weight.

EXAMPLES

The following Examples A, B, C, D, E and F describe the preparation of compositions comprising adhesion promoting agents comprising a modified chlorinated polyolefin. Example G describes the preparation of a scuff pad having a cleaning composition comprising a detergent absorbed therein. Examples 1 to 7 describe the application of compositions comprising an adhesion promoting agent to various articles comprising a plastic substrate, in accordance with embodiments of the methods and systems of the present invention.

Example A

A composition comprising an adhesion promoting agent comprising a chlorinated polyolefin having an acrylic monomer grafted thereon was prepared by adding Charge I (1163.2 parts by weight toluene and 320.0 parts by weight of CP-343-1, a chlorinated polyolefin commercially available from Eastman Chemical Products, Inc., of Rochester, N.Y.), under agitation and a nitrogen blanket to a 5 liter round bottom glass reaction vessel equipped with a stirrer, a condenser, two feed ports and means for maintaining a nitrogen blanket. The mixture was brought to reflux and then the nitrogen blanket was discontinued. Charge 2 (360.0 parts by weight of butyl methacrylate and 120.0 parts by weight of hydroxypropyl methacrylate) and Charge 3 (1120.0 parts by weight toluene and 16.0 parts by weight Luperox 26, t-butyl peroxy-2-ethylhexanoate commercially available from Atofina Canada Inc., Ontario, Canada) were added uniformly and simultaneously to the vessel over a two hour period while maintaining reflux conditions. Upon completion of Charges II and III, Charge IV (200.0 parts by weight toluene and 4.0 parts by weight Luperox 26) was added over a 30 minute period followed by a 30 minute hold period maintaining reflux conditions. The resulting polymer had a solids content of 22.6%, an —OH number of 14.3, and a weight average molecular weight of 28,109 as determined by gel permeation chromatography using a polystyrene standard.

Example B

A composition comprising an adhesion promoting agent comprising a chlorinated polyolefin having an acrylic monomer grafted thereon was prepared by adding Charge I (1400.0 parts by weight xylene, 600.0 parts by weight of CP-343-1, and 100.0 parts by weight cyclohexene oxide), under agitation and a nitrogen blanket to a 5 liter round bottom glass reaction vessel equipped with a stirrer, a condenser, two feed ports and means for maintaining a nitrogen blanket. The mixture was heated to 80° C. under a nitrogen blanket at 0.2 cubic feet per minute and held for 1.5 hours. Charge II (10.20 parts by weight of 2,2'-Bipyridyl, 3.05 parts by weight of Copper, and 60.0 parts by weight of butyl acetate) was added and held for 15 minutes. Charge III (225.0 parts by weight of hydroxylpropyl methacrylate and 675.0 parts by weight of butyl methacrylate) was then added over a two hour period. The mixture was held until a total solids of 48-52% was achieved. Charge IV (950.0 parts by weight of butyl acetate, 950.0 parts by weight of xylene, and 25.5 parts by weight of acetic acid) was then added. Charge V (1.5% based on total reaction solids of Amberlite® IRC 748: ion-exchange resin available Acros Organics N.V., Fair Lawn, N.J.) was then added and the reaction was held for 1.5 hours at 85° C. The reaction product was filtered through a 5 micron bag and then a 1 micron bag. The resulting product had a solids content of 22%, and a weight average molecular weight of 64,797 as determined by gel permeation chromatography using a polystyrene standard.

Example C

A composition comprising an adhesion promoting agent comprising a chlorinated polyolefin having an acrylic monomer grafted thereon was prepared in the same manner as described in Example A, with one exception. To Charge I was added 1 weight percent based on the total solids weight of Cardura E, an aliphatic mono glycidyl functional material, commercially available from Resolution Performance Products LLC, Houston, Tex.

Example D

A composition comprising an adhesion promoting agent comprising a chlorinated polyolefin having an acrylic monomer grafted thereon was prepared in the same manner as described in Example A, with one exception. To Charge I was added 1 weight percent of glycidyl methacrylate based on the total solids weight of Charge 1.

Example E

A composition comprising an adhesion promoting agent comprising a modified chlorinated polyolefin dispersed in an aqueous medium was prepared as follows. In a suitably equipped container, 3.3 parts by weight of Aerosol OT-75 (an anionic surfactant commercially available from Cytec Industries, Inc., West Paterson, N.J.) and 790.2 parts by weight of distilled water were mixed for 10 minutes. To this stirred solution, 206.5 parts by weight of the adhesion promoting agent prepared in Example B was added over 15 minutes, and then the mixture was stirred for 30 minutes. The resulting composition had a solids content of 4.02% and a pH of 4.94.

Example F

A composition comprising an adhesion promoting agent comprising a modified chlorinated polyolefin dispersed in an aqueous medium was prepared as follows. In a suitably equipped container, 3.3 parts by weight of Aerosol OT-75 and 790.2 parts by weight of distilled water were mixed for 10 minutes. To this stirred solution, 206.5 parts by weight of the adhesion promoting agent prepared in Example A was added over 15 minutes, and then the mixture was stirred for 30 minutes. 3.75 parts by weight of 25 weight percent dimethylethanolamine in water was then added to the mixture over 1 minute and stirred for 15 minutes. The resulting composition had a solids content of 4.7% and a pH of 8.6.

Example G

A cleaning composition was prepared by mixing 754.25 parts by weight of deionized water with 81.3 parts by weight of d-Limonene. A Scotch-Brite® Scuff Sponge (gray or gold), commercially available from 3M Company, St. Paul, Minn., was loaded to saturation with the cleaning composition by immersing the Scuff Sponge into a container of the cleaning composition. Any excess cleaning composition was allowed to drip off of the Scuff Sponge.

Example 1

Automobile bumpers supplied from various automobile manufacturers and comprising a thermoplastic polyolefin substrate were subjected to coating processes wherein an adhesion promoting agent was applied to the substrate. Examples 1A through 1E in Table 1 were prepared as follows. The area of the substrate to be painted was wiped with a saturated Scuff Sponge prepared as described in Example G. After drying, a composition comprising an adhesion promoting agent (specified as "Ad Pro Wipe Type" in Table 1) was wiped onto the area of the substrate to be painted. The wipe was prepared by pouring the composition identified in Table 1 onto a Kimtech® Precision Wipe, commercially available from Kimberly-Clark Corporation, and allowing the excess to drip off of the wipe. After drying, a second composition comprising an adhesion promoting agent (specified as "Ad Pro Spray Type" in Table 1) was sprayed onto the area of the substrate to be painted using a HVLP (high volume low pressure) hand spray gun. After drying, the substrate was painted with BC4329 basecoat and D893 low VOC clearcoat, both of which are commercially available from PPG Industries, Inc., in accordance with the instructions provided on the product data sheet supplied by the manufacturer.

Comparative Examples 1F through 1J in Table 1 were prepared as follows. The area to be painted was washed with soap and water and cleaned with DX 330 Acrylic Cleaner commercially available from PPG Industries, Inc. After drying, the area of the substrate to be painted was scuffed with a gold Scotch-Brite® Scuff Sponge. The area was then cleaned again with DX 330 and any excess was removed with a clean damp cloth. The area of the substrate to be painted was then wiped with DX 103, a wipe containing an antistatic agent, which is commercially available from PPG Industries, Inc. After drying, a composition comprising an adhesion promoting agent was sprayed onto the area of the surface to be painted using a HVLP hand spray gun. After drying, the substrate was painted with BC4329 basecoat and D893 low VOC clearcoat, as described above. The results are reported in Table 1.

TABLE 1

| Example | Substrate Type | Ad Pro Wipe Type | Ad Pro Spray Type | 24 hour Adhesion[4] |
|---|---|---|---|---|
| 1A | Nissan | A[1] | B[2] | 100% |
| 1B | Toyota | A | B | 100% |
| 1C | Chrysler Smooth | A | B | 100% |
| 1D | Chrysler Textured | A | B | 100% |
| 1E | Subaru | A | B | 100% |
| Comparative 1F | Nissan | None | C[3] | 100% |
| Comparative 1G | Toyota | None | C | 95% |
| Comparative 1H | Chrysler Smooth | None | C | 100% |
| Comparative 1I | Chrysler Textured | None | C | 55% |
| Comparative 1J | Subaru | None | C | 45% |

[1]Ad Pro Wipe Type A was prepared by reducing the composition prepared in Example A to 2% solids using P273-1050, a solvent blend that includes an anti-static agent, commercially available from PPG Industries, Inc.
[2]Ad Pro Spray Type B was prepared by reducing the composition prepared in Example A to 5% solids using xylene.
[3]Ad Pro Spray Type C was DPX 801, an adhesion promoting composition comprising a chlorinated polyolefin, commercially available from PPG Industries, Inc.
[4]24 hour coating adhesion was evaluated using a Crosshatch adhesion test. Using a multi-blade cutter (Paul N. Gardner Company, Inc.), coated panels were scribed twice (at 90°), making sure the blades cut through all coating layers into the substrate. Coating adhesion was measured using Nichiban L-24 tape (four pulls at 90°). Failure mode was adhesive between the substrate and adhesion promoter, unless otherwise noted in the results. Adhesion measurements were taken after one day of ambient cure of the coating after application. Results are reported in %, wherein 100% represents no coating adhesion failure.

Example 2

Thermoplastic polyolefin ("TPO") and polypropylene ("PP") substrates were subjected to coating processes wherein an adhesion promoting agent was applied to the substrate. Step 1 of the process comprised wiping the surface to be painted with a Scuff Sponge saturated with a cleaning composition prepared as described in Example G. Step 2 of the process comprised wiping the surface to be painted with a composition prepared by reducing the composition prepared in Example A to 1% solids using P273-1050. The wipe was prepared by pouring that composition onto a Kimtech® Precision Wipe and allowing the excess to drip off of the wipe. Step 3 of the process comprised spraying the surface to be painted with a composition prepared by reducing the composition prepared in Example A to 5% solids using xylene. The composition was sprayed onto the area of the substrate to be painted using a HVLP hand spray gun. In each Example, at least two of Steps 1 to 3 were performed, as described in Table 2. In the Comparative Examples identified in Table 2, either Step 2 or Step 3 was omitted. After drying, the substrate was painted with BC4320 basecoat and D893 low VOC clearcoat, in accordance with the manufacturer's instructions. Results are reported in Table 2.

TABLE 2

| Example | Substrate Type | Perform Step 1? | Perform Step 2? | Perform Step 3? | Adhesion 24 hr[5] | Adhesion 7 day[6] | Adhesion 10 day humidity[7] |
|---|---|---|---|---|---|---|---|
| 2A | PP | Yes | Yes | Yes | 100% | 100% | 100% (35% bc/coh)[8] |

TABLE 2-continued

| Example | Substrate Type | Perform Step 1? | Perform Step 2? | Perform Step 3? | Adhesion 24 hr[5] | Adhesion 7 day[6] | Adhesion 10 day humidity[7] |
|---|---|---|---|---|---|---|---|
| Comparative 2B | PP | Yes | Yes | No | 84% | 100% | 100% (25% bc/ad pro) |
| Comparative 2C | PP | Yes | No | Yes | 100% | 90% | 100% (90% bc/coh) |
| 2D | PP | No | Yes | Yes | 100% | 100% | 100% (75% bc/coh) |
| 2E | TPO | Yes | Yes | Yes | 100% | 100% | 100% (100% bc/coh) |
| Comparative 2F | TPO | Yes | Yes | No | 100% | 100% | 100% (75% bc/coh) |
| Comparative 2G | TPO | Yes | No | Yes | 100% | 100% | 100% (100% bc/coh) |
| 2H | TPO | No | Yes | Yes | 100% | 100% | 100% (86% bc/coh) |

[5] 24 hour coating adhesion was measured as described above in Table 1.
[6] 7 days coating adhesion was evaluated in the same manner as the 24 hour coating adhesion, except that adhesion measurements were taken after seven days of ambient cure of the coating after application.
[7] 10 day humidity coating adhesion was evaluated in the same manner as the 24 hour coating adhesion, except that adhesion measurements were taken after ten days of cure of the coating at 100° F. and 100% relative humidity.
[8] "bc/coh" identifies cohesive splitting of the basecoat (failure of the basecoat). Results are reported in %, wherein 100% represents no splitting of the basecoat.

Example 3

Thermoplastic polyolefin ("TPO") and polypropylene ("PP") substrates were subjected coating processes wherein an adhesion promoting agent was applied to the substrate. First, the surface to be painted was wiped with a Scuff Sponge saturated with a cleaning composition prepared as described in Example G. After rinsing with water and drying, the surface to be painted was wiped with a composition comprising an adhesion promoting agent. The compositions and preparation of the wipes is described in Table 3 and identified as "Ad Pro Wipe". As is apparent, in certain Comparative Examples, this wiping step was omitted. After allowing to dry, the surface to be painted was sprayed with a composition prepared by reducing the composition prepared in Example A to 5 percent solids using xylene. That composition was sprayed onto the area of the substrate to be painted using a HVLP hand spray gun. In Comparative Examples 3C, 3D, 3G, 3H, 3K, 3L, 3O, 3P, 3S, and 3T, this spraying step was omitted. After drying, the substrate was painted with BC3964 basecoat and D893 low VOC clearcoat, in accordance with the manufacturer's instructions. Results are reported in Table 3.

TABLE 3

| Example | Substrate | Ad Pro Wipe Type | Adhesion 24 hr[9] | Adhesion 7 day[10] | Adhesion 10 day humidity[11] |
|---|---|---|---|---|---|
| 3A | TPO | D[12] | 100% | 100% | 100% |
| 3B | PP | D | 100% | 100% | 100% |
| Comparative 3C | TPO | D | 100% | 100% | 100% |
| Comparative 3D | PP | D | 100% | 100% | 100% |
| 3E | TPO | E[13] | 100% | 100% | 100% |
| 3F | PP | E | 100% | 100% | 100% |
| Comparative 3G | TPO | E | 100% | 100% | 100% |
| Comparative 3H | PP | E | 100% | 100% | 100% |
| 3I | TPO | F[14] | 100% | 100% | 100% |
| 3J | PP | F | 15% | 20% | 80% |
| Comparative 3K | TPO | F | 76% | 92% | 80% |
| Comparative 3L | PP | F | 0% | 10% | 0% |
| 3M | TPO | G[15] | 65% | 75% | 90% |
| 3N | PP | G | 0% | 60% | 0% |
| Comparative 3O | TPO | G | 98% | 100% | 99% |
| Comparative 3P | PP | G | 65% | 60% | 20% |
| Comparative 3Q | TPO | None | 100% | 100% | 100% |
| Comparative 3R | PP | None | 15% | 60% | 25% |
| Comparative 3S | TPO | None | 0% | 0% | 0% |
| Comparative 3T | PP | None | 0% | 0% | 0% |

[9] 24 hour coating adhesion was measured as described above in Table 1.
[10] 7 days coating adhesion was evaluated as described above in Table 2.
[11] 10 day humidity coating adhesion was evaluated as described above in Table 2.
[12] Ad Pro Wipe Type D was prepared by reducing the composition prepared in Example B to 5% solids using xylene. The wipe was prepared by pouring that composition onto a Kimtech ® Precision Wipe and allowing the excess to drip off of the wipe.
[13] Ad Pro Wipe Type E was prepared by reducing the composition prepared in Example A to 5% solids using xylene. The wipe was prepared by pouring that composition onto a Kimtech ® Precision Wipe and allowing the excess to drip off of the wipe.
[14] Ad Pro Wipe Type F was prepared by pouring the composition prepared in Example E onto a Kimtech ® Precision Wipe and allowing the excess to drip off of the wipe.
[15] Ad Pro Wipe Type G was prepared by pouring the composition prepared in Example F onto a Kimtech ® Precision Wipe and allowing the excess to drip off of the wipe.

Example 4

Thermoplastic polyolefin ("TPO") and polypropylene ("PP") substrates were subjected to coating processes wherein an adhesion promoting agent was applied to the substrate. Step 1 of the process comprised wiping the surface to be painted with a Scuff Sponge saturated with a cleaning composition prepared as described in Example G. Step 2 of the process comprised wiping the surface to be painted with a composition prepared by reducing the composition prepared in Example A to 1% solids using P273-1050. The wipe was prepared by pouring that composition onto a Kimtech® Precision Wipe and allowing the excess to drip off of the wipe. After allowing to dry, the surface to be painted was sprayed with a composition comprising an adhesion promoting agent.

The compositions and their applications are described in Table 4 and identified as "Ad Pro Spray". In the Comparative Examples identified in Table 4, Step 2 was omitted. After drying, the substrate was painted with BC4329 basecoat and D893 low VOC clearcoat, in accordance with the manufacturer's instructions. Results are reported in Table 4.

TABLE 4

| Example | Substrate | Ad Pro Spray | Adhesion 24 hr[16] |
|---|---|---|---|
| Comparative 4A | TPO | B[17] | 100% |
| Comparative 4B | PP | B | 100% |
| 4C | TPO | B | 100% |
| 4D | PP | B | 100% |
| Comparative 4E | TPO | H[18] | 100% |
| Comparative 4F | PP | H | 35% |
| 4G | TPO | H | 100% |
| 4H | PP | H | 100% |
| Comparative 4I | TPO | I[19] | 100% |
| Comparative 4J | PP | I | 90% |
| 4K | TPO | I | 100% |
| 4L | PP | I | 100% |

[16] 24 hour coating adhesion was measured as described above in Table 1.
[17] Ad Pro Spray type B was prepared and applied as described in Table 1 above.
[18] Ad Pro Spray type H was an aerosol composition comprising 86.3 parts by weight of the composition prepared in Example A, 345.1 parts by weight xylene, and 184.9 parts by weight of Aeron® NP-70 Gas mixture commercially available from Diversified Chemicals & Propellants Co., Hinsdale, Illinois. The aerosol composition was prepared by placing the Example A composition and xylene into a spray can and then vacuuming the can. The gas mixture was injected into the can and the can was pressurized until the can contained all of the gas mixture. The aerosol composition was then sprayed onto the area of the substrate to be painted.
[19] Ad Pro Spray type I was an aerosol composition comprising 44.4 parts by weight of the composition prepared in Example A, 158.1 parts by weight xylene, and 86.8 parts by weight of a propane, n-butane, i-butane gas mixture from Peter Kwasny GmbH, Gundelsheim, Germany. The aerosol composition was prepared by placing the Example A composition and xylene into a spray can and then vacuuming the can. The gas mixture was injected into the can and the can was pressurized until the can contained all of the gas mixture. The aerosol composition was then sprayed onto the area of the substrate to be painted.

Example 5

Thermoplastic polyolefin ("TPO") and polypropylene ("PP") substrates were subjected coating processes wherein an adhesion promoting agent was applied to the substrate. Step 1 of the process comprised wiping the surface to be painted with a Scuff Sponge saturated with a cleaning composition prepared as described in Example G. After rinsing with water and drying, step 2 of the process comprised wiping the surface to be painted with a composition prepared by reducing the composition prepared in Example A to 1% solids using P273-1050. The wipe was prepared by pouring that composition onto a Kimtech® Precision Wipe and allowing the excess to drip off of the wipe. Step 3 of the process comprised spraying the surface to be painted with a composition prepared by reducing the composition prepared in Example A to 5% solids using xylene. The composition was sprayed onto the area of the substrate to be painted using a HVLP hand spray gun. After allowing to dry, step 4 of the process comprised spraying the surface to be painted with a primer coating composition using a HVLP hand spray gun. These primer coating compositions are described in Table 5 and identified as "Primer". In some cases, Step 3 was omitted as indicated in Table 5. After step 4, the substrate was painted with BC4295 basecoat and D893 low VOC clearcoat, in accordance with the manufacturer's instructions. Results are reported in Table 5.

TABLE 5

| Example | Substrate | Step 3 Performed? | Primer | Adhesion 24 hr[20] | Adhesion 7 day[21] | Adhesion 10 day humidity[22] |
|---|---|---|---|---|---|---|
| 5A | TPO | Yes | J[23] | 100% | 100% | 100% (90% bc/coh)[27] |
| 5B | PP | Yes | J | 100% | 100% | 100% (20% bc/coh) |
| 5C | TPO | No | K[24] | 100% | 100% | 100% (80% bc/coh) |
| 5D | PP | No | K | 100% | 100% | 100% (90% bc/coh) |
| 5E | TPO | No | L[25] | 100% | 100% | 100% (55% bc/coh) |
| 5F | PP | No | L | 100% | 100% | 100% (95% bc/coh) |
| 5G | TPO | No | M[26] | 100% | 100% | 100% (45% bc/coh) |
| 5H | PP | No | M | 100% | 100% | 100% (45% bc/coh)% |

[20] 24 hour coating adhesion was measured as described above in Table 1.
[21] 7 days coating adhesion was evaluated as described above in Table 2.
[22] 10 day humidity coating adhesion was evaluated as described above in Table 2.
[23] Primer J comprised a mixture of 185 parts by weight of P565-510, a resin commercially available from PPG Industries, Inc., 19.5 parts by weight of P210-796, a hardener commercially available from PPG Industries, Inc., and 20.6 parts by weight of P850-1693, a reducer commercially available from PPG Industries, Inc.
[24] Primer K comprised a mixture of 185 parts by weight of P565-510, 19.5 parts by weight of P210-796, 20.6 parts by weight of P850-1693, and 3.7 parts by weight of the composition prepared in Example A.
[25] Primer L comprised a mixture of 185 parts by weight of P565-510, 19.5 parts by weight of P210-796, 20.6 parts by weight of P850-1693, and 6.2 parts by weight of the composition prepared in Example A.
[26] Primer M comprised a mixture of 185 parts by weight of P565-510, 19.5 parts by weight of P210-796, 20.6 parts by weight of P850-1693, and 12.4 parts by weight of the composition prepared in Example A.
[27] "bc/coh" refers to cohesive splitting of the basecoat as described in Table 2 above.

Example 6

Thermoplastic polyolefin ("TPO") and polypropylene ("PP") substrates were subjected coating processes wherein an adhesion promoting agent was applied to the substrate. Step 1 of the process comprised wiping the surface to be painted with a Scuff Sponge saturated with a cleaning composition prepared as described in Example G. After rinsing with water and drying, step 2 of the process comprised wiping the surface with Ad Pro Wipe Type D identified in Table 3 above. The wipes were prepared by pouring that composition onto a Kimtech® Precision Wipe and allowing the excess to drip off of the wipe. As is apparent in Table 6, in certain Comparative Examples, this wiping step was omitted. After allowing to dry, step 3 of the process comprised spraying the surface to be painted with a composition comprising an adhesion promoting agent. The various compositions used are described in Table 6 and identified as "Ad Pro Spray". The composition was sprayed onto the area of the substrate to be painted using a HVLP hand spray gun. As is apparent, in certain Comparative Examples, this spraying step was omitted. After drying, the substrate was painted with BC4320 basecoat and DCU-2042 clearcoat, in accordance with the manufacturer's instructions. Results are reported in Table 6.

TABLE 6

| Example | Substrate | Ad Pro Wipe? | Ad Pro Spray | Adhesion 24 hr[28] | Adhesion 7 day[29] | Adhesion 10 day humidity[30] |
|---|---|---|---|---|---|---|
| Comparative 6A | TPO | Yes | None | 100% | 100% | 100% |
| Comparative 6B | PP | Yes | None | 100% | 100% | 100% |
| Comparative 6C | TPO | No | O[31] | 100% | 100% | 100% |
| Comparative 6D | PP | No | O | 100% | 100% | 100% |
| Comparative 6E | TPO | No | B[32] | 100% | 100% | 100% |
| Comparative 6F | PP | No | B | 100% | 100% | 100% |
| Comparative 6G | TPO | No | B | 100% | 100% | 100% |
| Comparative 6H | PP | No | B | 100% | 100% | 100% (90% bc/coh) |
| Comparative 6I | TPO | No | C[33] | 100% | 100% | 100% |
| Comparative 6J | PP | No | C | 100% | 100% | 100% |
| 6K | TPO | Yes | O | 100% | 100% | 100% (60% bc/coh) |
| 6L | PP | Yes | O | 100% | 100% | 100% (90% bc/coh) |
| 6M | TPO | Yes | C | 100% | 100% | 100% |
| 6N | PP | Yes | C | 100% | 100% | 100% (80% bc/coh) |
| Comparative 6O | TPO | Yes | None | 100% | 100% | 100% |
| Comparative 6P | PP | Yes | None | 90% | 100% | 100% |
| Comparative 6Q | TPO | Yes | None | 100% | 90% | 100% |
| Comparative 6R | PP | Yes | None | 90% | 40% | 100% |
| Comparative 6S | TPO | No | O | 100% | 100% | 100% |
| Comparative 6T | PP | No | O | 100% | 100% | 100% |
| 6U | TPO | Yes | O | 100% | 100% | 100% |
| 6V | PP | Yes | O | 100% | 100% | 100% |

[28]24 hour coating adhesion was measured as described above in Table 1.
[29]7 days coating adhesion was evaluated as described above in Table 2.
[30]10 day humidity coating adhesion was evaluated as described above in Table 2.
[31]Ad Pro Spray O was prepared by reducing the composition prepared in Example B to 5% solids using xylene.
[32]Ad Pro Spray B was prepared and applied as described in Table 1 above.
[33]Ad Pro Spray C was prepared and applied as described in Table 1 above.

Example 7

Thermoplastic polyolefin ("TPO") and polypropylene ("PP") substrates were subjected coating processes wherein an adhesion promoting agent was applied to the substrate. First, the surface to be painted was wiped with a Scuff Sponge saturated with a cleaning composition prepared as described in Example G. After rinsing with water and drying, the surface to be painted was wiped with a composition comprising an adhesion promoting agent. The compositions and preparation of the wipes is described in Table 3 and identified as "Ad Pro Wipe". As is apparent in Table 7, in certain Comparative Examples, this wiping step was omitted. After allowing to dry, the surface to be painted was sprayed with a composition comprising an adhesion promoting agent. The various compositions used are described in Table 7 and identified as "Ad Pro Spray". These compositions were sprayed onto the area of the substrate to be painted using a HVLP hand spray gun. As is apparent in Table 7, in certain Comparative Examples, this spraying step was omitted. After drying, the substrate was painted with BC3964 basecoat and D893 low VOC clearcoat, in accordance with the manufacturer's instructions. Results are reported in Table 7.

TABLE 7

| Example | Substrate | Ad Pro Wipe Type | Ad Pro Spray Type | Adhesion 24 hr[34] | Adhesion 7 day[35] |
|---|---|---|---|---|---|
| Comparative 7A | TPO | P[36] | None | 100% | 100% |
| Comparative 7B | PP | P | None | 10% | 80% |
| Comparative 7C | TPO | None | C[40] | 88% | 100% |
| Comparative 7D | PP | None | C | 0% | 0% |
| 7E | TPO | P | C | 100% | 100% |
| 7F | PP | P | C | 88% | 100% |
| Comparative 7G | TPO | Q[37] | None | 100% | 100% |
| Comparative 7H | PP | Q | None | 75% | 100% |

TABLE 7-continued

| Example | Substrate | Ad Pro Wipe Type | Ad Pro Spray Type | Adhesion 24 hr[34] | Adhesion 7 day[35] |
|---|---|---|---|---|---|
| Comparative 7I | TPO | None | B[41] | 100% | 100% |
| Comparative 7J | PP | None | B | 0% | 75% |
| 7K | TPO | Q | B | 100% | 100% |
| 7L | PP | Q | B | 100% | 100% |
| Comparative 7M | TPO | R[38] | None | 100% | 100% |
| Comparative 7N | PP | R | None | 95% | 100% |
| Comparative 7O | TPO | None | U[42] | 100% | 100% |

TABLE 7-continued

| Example | Substrate | Ad Pro Wipe Type | Ad Pro Spray Type | Adhesion 24 hr[34] | Adhesion 7 day[35] |
|---|---|---|---|---|---|
| Comparative 7P | PP | None | U | 0% | 65% |
| 7Q | TPO | R | U | 100% | 100% |
| 7R | PP | R | U | 100% | 100% |
| Comparative 7S | TPO | S[39] | None | 100% | 100% |
| Comparative 7T | PP | S | None | 100% | 100% |
| Comparative 7U | TPO | None | V[43] | 100% | 100% |
| Comparative 7V | PP | None | V | 0% | 15% |
| 7W | TPO | S | V | 100% | 100% |
| 7X | PP | S | V | 100% | 100% |

[34] 24 hour coating adhesion was measured as described above in Table 1.
[35] 7 days coating adhesion was evaluated as described above in Table 2.
[36] Ad Pro Wipe Type P was prepared by reducing DPX 801 to 1% solids using P273-1050. The wipe was prepared by pouring that composition onto a Kimtech ® Precision Wipe and allowing the excess to drip off of the wipe.
[37] Ad Pro Wipe Type Q was prepared by reducing the composition prepared in Example A to 1% solids using P273-1050. The wipe was prepared by pouring that composition onto a Kimtech ® Precision Wipe and allowing the excess to drip off of the wipe.
[38] Ad Pro Wipe Type R was prepared by reducing the composition prepared in Example C to 1% solids using P273-1050. The wipe was prepared by pouring that composition onto a Kimtech ® Precision Wipe and allowing the excess to drip off of the wipe.
[39] Ad Pro Wipe Type S was prepared by reducing the composition prepared in Example D to 1% solids using P273-1050. The wipe was prepared by pouring that composition onto a Kimtech ® Precision Wipe and allowing the excess to drip off of the wipe.
[40] Ad Pro Spray Type C was prepared and applied as described in Table 1 above.
[41] Ad Pro Spray Type B was prepared and applied as described in Table 1 above.
[42] Ad Pro Spray Type U was prepared by reducing the composition prepared in Example C to 5% solids using xylene.
[43] Ad Pro Spray Type V was prepared by reducing the composition prepared in Example D to 5% solids using xylene.

As is apparent from the foregoing, while refinishing processes that apply an adhesion promoting agent only once during the refinish process often result in coatings that have adequate, or even excellent, adhesion to a plastic substrate, the methods and systems of the present invention can provide consistently excellent adhesion results. Indeed, it is anticipated that the methods and systems of the present invention can result in coatings with excellent adhesion over plastic substrates more consistently than processes wherein an adhesion promoting agent is applied only once, particularly in an automobile body shop setting.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A method for coating an article comprising a plastic substrate, the method comprising the steps of:
   a. applying a composition comprising an adhesion promoting agent to at least a portion of the substrate by a first application technique;
   b. applying a composition comprising an adhesion promoting agent over at least a portion of the composition applied in step (a) by a second application technique that is different from the first application technique; and
   c. applying a protective and decorative coating system over at least a portion of the compositions applied in steps (a) and (b)

wherein the adhesion promoting agent of the first composition is the same or different than the adhesion promoting agent of the second composition and the adhesion promoting agents comprise a halogenated polyolefin that is modified by grafting a compatibilizing material onto the polyolefin.

2. The method of claim 1, wherein the adhesion promoting agent of the composition applied by the second application technique is the same as the adhesion promoting agent of the composition applied by the first application technique.

3. The method of claim 1, wherein the halogenated polyolefin that is modified by grafting a compatibilizing material onto the polyolefin comprises a chlorinated polyolefin having an acrylic monomer grafted thereon.

4. The method of claim 1, wherein the adhesion promoting agent comprises 1 up to 10 percent by weight of the composition applied by the first application technique.

5. The method of claim 1, wherein the composition applied by the first application technique further comprises an organic solvent.

6. The method of claim 5, wherein the composition applied by the first application technique further comprises an antistatic agent.

7. The method of claim 1, wherein the composition applied by the first application technique comprises an emulsion prepared by introducing an organic component comprising an adhesion promoting agent into an aqueous medium.

8. The method of claim 1, wherein at least one of the first application technique and the second application technique comprises wiping.

9. The method of claim 8, wherein the first application technique comprises wiping the substrate with an absorbent fibrous material loaded with the composition comprising an adhesion promoting agent.

10. The method of claim 1 further comprising the step of cleaning the substrate before applying a composition comprising an adhesion promoting agent.

11. The method of claim 10, wherein the cleaning step comprises contacting the substrate with an abrasive material having a cleaning composition contained therein.

12. The method of claim 1, wherein the adhesion promoting agent comprises 1 up to 50 percent by weight of the composition applied by the second application technique.

13. The method of claim 1, wherein the composition applied by the second application technique is different than the composition applied by the first application technique.

14. The method of claim 9, wherein the second application technique comprises spraying.

15. The method of claim 14, wherein the composition applied by the second application technique is in the form of an aerosol.

* * * * *